No. 818,839. PATENTED APR. 24, 1906.
R. T. LOVE.
CULTIVATOR.
APPLICATION FILED JULY 7, 1905.
2 SHEETS—SHEET 1.
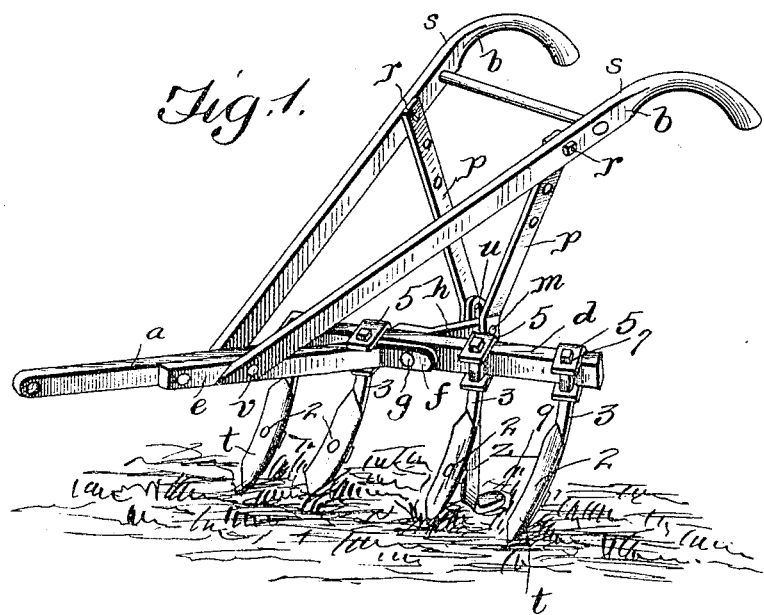
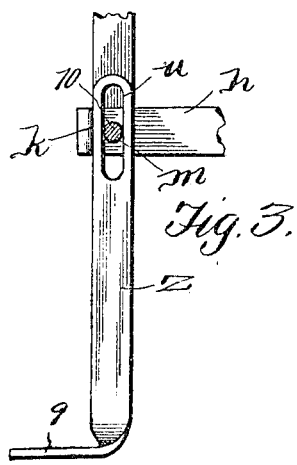
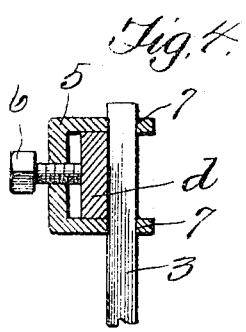
Witnesses
R. A. Boswell
George M. Anderson
Inventor
Robert T. Love
By E. W. Anderson
his Attorney No. 818,839.  
PATENTED APR. 24, 1906.  
R. T. LOVE.  
CULTIVATOR.  
APPLICATION FILED JULY 7, 1905.  
2 SHEETS—SHEET 2.
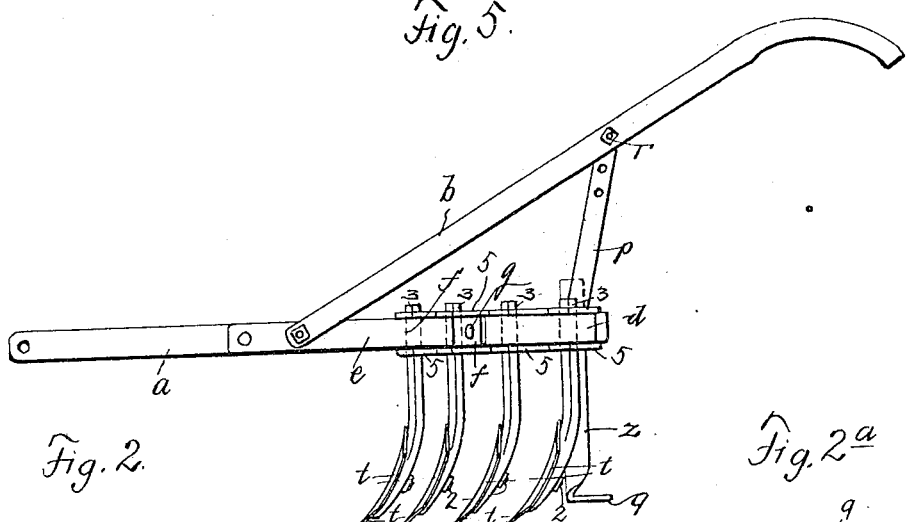
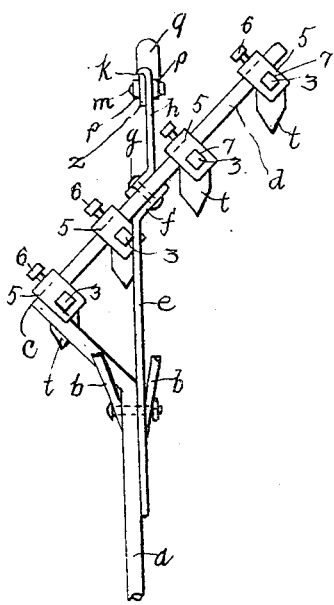
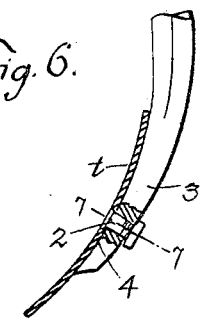
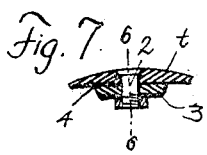
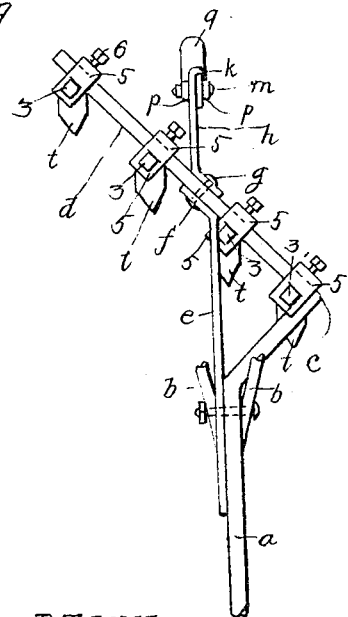
WITNESSES  
George M Anderson  
Wm Braun
R. T. LOVE,  
INVENTOR  
by E. W. Anderson  
his Attorney.

UNITED STATES PATENT OFFICE.

ROBERT T. LOVE, OF WEST MONROE, LOUISIANA.

CULTIVATOR.

No. 818,839.   Specification of Letters Patent.   Patented April 24, 1906.

Application filed July 7, 1905. Serial No. 268,754.

*To all whom it may concern:*

Be it known that I, ROBERT T. LOVE, a citizen of the United States, and a resident of West Monroe, in the parish of Ouachita and State of Louisiana, have made a certain new and useful Invention in Cultivators; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1 is a perspective view of my cultivator. Fig. 2 is a horizontal section of the same, taken below the handles. Fig. 2$^a$ is a similar view, showing the cultivator with teeth reversed to operate on the other side of the row. Fig. 3 is a detail sectional view on the line 3 3, Fig. 2, illustrating the adjustment of the heel-slide. Fig. 4 is a detail sectional view on the line 4 4, Fig. 2, illustrating the manner of securing the teeth 2 to the teeth-carrying bar. Fig. 5 is a side elevation of the invention. Fig. 6 is a sectional detail view on the line 6 6, Fig. 7. Fig. 7 is a sectional detail view taken on the line 7 7, Fig. 6.

The invention has relation to cultivators; and it consists in the novel construction and combinations of parts, as hereinafter set forth.

The invention relates particularly to that class of cultivators known as "side-harrow" cultivators, wherein the teeth are arranged in an oblique line to operate toward the row either on the right or on the left.

In the accompanying drawings, illustrating the invention, a horizontal metal frame is shown, having a draft-beam, an oblique rear bar to which the teeth are connected, a brace-bar extending in line with the draft-beam, and a rear offset for carrying the gage or heel-slide and connected to the lower ends of the handle-braces. This frame is constructed in a horizontal plane and is reversible.

The letter $a$ designates the draft-beam, bent obliquely to one side in rear of the point of attachment for the handles $b$ to provide a rectangular extension $c$, having the oblique rear tooth-carrying bar $d$, extending across the line of the draft-beam to the other side thereof. The direction of the bar $d$ is lateral and rearward, the angular relation to the line of draft being about one hundred and thirty-five degrees. To the draft-beam forward of the point of attachment of the handles is secured a brace-bar $e$, extending to the rear in the line of said draft-beam and provided with an oblique rear lug $f$, which is secured to the tooth-carrying bar $d$ by a rivet or bolt $g$, which also secures the rear offset bar $h$ to said bar $d$. This rear offset bar is also provided with an oblique attachment-lug at its forward end and at its rear end is made with a lateral brace-flange $k$. The offset bar is designed to be attached to the oblique tooth-carrying bar at about its middle portion and to extend backward in the line or nearly in the line of draft in order to place it in proper position to carry the gage and to provide for the attachment of the handle-braces. Its rear end portion in front of the lateral flange is provided with a perforation for a horizontal bolt $m$, whereby the handle-braces and the gage are secured in position. The handle-braces $p$ are connected to the handles $s$, and the handles are rendered adjustable by means of a series of perforations in the braces for the securing-bolts $r$ and by the pivotal character of the attachment-bolt $v$, whereby the forward ends of the handles are connected to the draft-beam. This frame is designed to extend in the horizontal plane and can be reversed. By detaching the handles, their braces, the teeth, and the heel-slide and reattaching them when the frame is reversed the cultivator will be changed to operate on the other side of the row, or, in other words, from a right-hand to a left-hand cultivator. Each tooth $t$ is provided with a countersunk perforation at its middle portion for the attachment-bolt 2. It is of elongated character, pointed at its ends, and is of regular curvation, presenting a front face concave from end to end and transversely convex. This tooth is reversible and is secured to a shank 3, which extends upward to the tooth-carrying bar.

The shank is made of squared bar-iron, its lower portion being curved downward and forward in accordance with the curvation of the back of the tooth. The front of the lower curved portion of this shank is reduced on the angle to provide a transverse seat 4 for the tooth attached thereto. As the transverse elements of this seat are straight and those of the back of the tooth which engage the same are also straight, the tooth cannot turn, although fastened by a single bolt.

The shanks of the tooth are secured to the bar $d$ by means of rectangular clamps 5, having threaded holes in their rear walls for set-screws 6. The upper and lower parallel branches of each clamp are provided with squared apertures or seats 7 for the upper portion of the shank of the tooth, which shank is held securely by the engagement of one of its rear faces with the front face of this bar when the set-screw is tightened. The teeth are readily arranged in series along the bar $d$ and are adjustable thereon. The forward tooth, which receives the brunt of the work, is further strengthened in position because of the angular engagement of its shank with the internal angle of the frame offset at 8.

The gage or heel-slide $z$ is usually made of a single bar of iron flattened from side to side and twisted half around at the lower end to provide the slide-foot 9, which is curved backward and extends to the rear. This upper portion of the shank of the gage is longitudinally slotted in the vertical direction, as at $u$, for the passage of a fastening-bolt 10, which also passes through a perforation in the rear offset bar of the frame and through the lower ends of the handle-braces. The gage is therefore adjustable vertically and is braced in position by the engagement of its rear edge with the lateral brace-flange $k$ at the end of said offset bar.

Having described the invention, what I claim, and desire to secure by Letters Patent, is—

1. In a cultivator, the combination of a horizontal draft-bar having a lateral offset bent portion, terminating in an oblique tooth-carrying bar meeting said offset bent portion in a right angle, and a horizontal brace-bar in the line of the draft-bar and connected thereto and to said tooth-carrying bar, substantially as specified.

2. In a cultivator, the combinaton of a horizontal draft-bar having a lateral offset bent portion terminating in an oblique tooth-carrying bar meeting said offset bent portion in a right angle, a horizontal brace-bar in the line of the draft-bar and connected thereto and to said tooth-carrying bar, and cultivator-teeth having angular shanks having bracing engagement with the forward face of the tooth-carrying bar, one of said teeth having its angular shank fitting closely in bracing engagement with the internal angle formed by the junction of the tooth-carrying bar and the lateral offset bent portion, substantially as specified.

3. In a cultivator, the combination of a horizontal draft-bar having a lateral offset bent portion terminating in an oblique tooth-carrying bar meeting said offset bent portion in a right angle, a horizontal brace-bar in line with the draft-bar and connected thereto and to said tooth-carrying bar, a rearward-extending bar in line with the draft-beam and connected to said tooth-carrying bar directly in rear of said horizontal brace-bar, and a heel-gage carried by said rear offset bar, substantially as specified.

In testimony whereof I affix my signature in presence of two witnesses.

ROBERT T. LOVE.

Witnesses:
S. J. FLEMING,
C. P. GRAYSON.